United States Patent [19]
Marsh

[11] 3,970,254
[45] July 20, 1976

[54] METHOD FOR SEPARATING GLASS FROM HEAT RESISTANT MATERIALS

[75] Inventor: Paul G. Marsh, Hamilton, Ohio

[73] Assignee: Black Clawson Fibreclaim, Inc., Middletown, Ohio

[22] Filed: Aug. 19, 1974

[21] Appl. No.: 498,850

[52] U.S. Cl. ................................ 241/1; 241/65; 241/DIG. 38; 241/23
[51] Int. Cl.² .................................. B02C 19/12
[58] Field of Search ........ 241/1, 17, 23, 65, DIG. 9, 241/DIG, 13, DIG. 38; 65/21, DIG. 3

[56] References Cited
UNITED STATES PATENTS

| | | | |
|---|---|---|---|
| 1,679,857 | 8/1928 | Hewitt | 241/1 |
| 1,718,264 | 6/1929 | Walton | 241/1 |
| 2,029,253 | 1/1936 | Walker | 241/23 X |
| 3,407,053 | 10/1968 | Schulz | 65/21 |
| 3,734,756 | 5/1973 | Pierce | 65/21 X |

Primary Examiner—Granville Y. Custer, Jr.
Attorney, Agent, or Firm—Biebel, French & Nauman

[57] ABSTRACT

Glass is recovered for use as cullet from mixtures of broken glass with pieces of metal and other heat resistant materials by a method wherein the mixture is thermally shocked by subjecting it to a rapid increase or decrease in temperature to induce cracks in and/or break-up of the glass particles, while the nonglass particles remain unchanged because of their nature, and the mixture is mechanically treated, by agitating or the like, so that the glass particles are broken up by further propagation of the induced cracks. Prior to the mechanical treatment, and preferably prior to the thermal shock treatment, the mixture is screened or otherwise treated to eliminate fines of all kinds. After the mechanical treatment, the mixture is further screened so that the glass particles, which have been reduced in size, can be recovered as the undersized fraction, while the nonglass particles, which have remained generally the same size, are retained on the screen. A number of modifications are disclosed.

13 Claims, 3 Drawing Figures

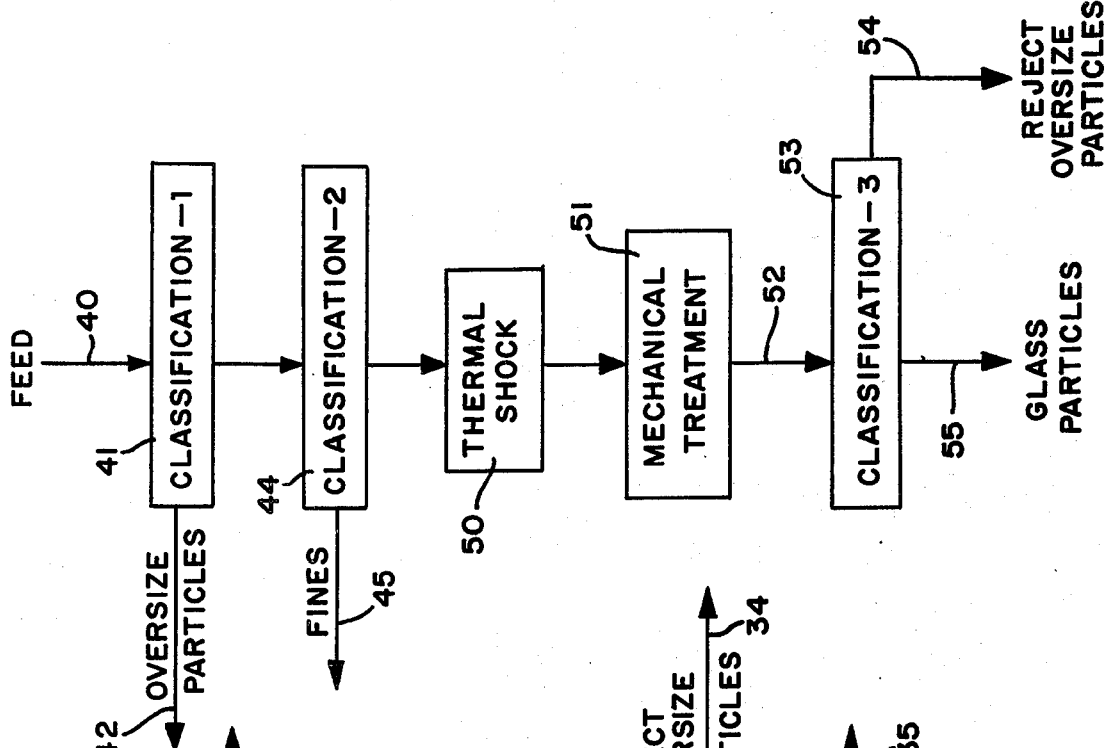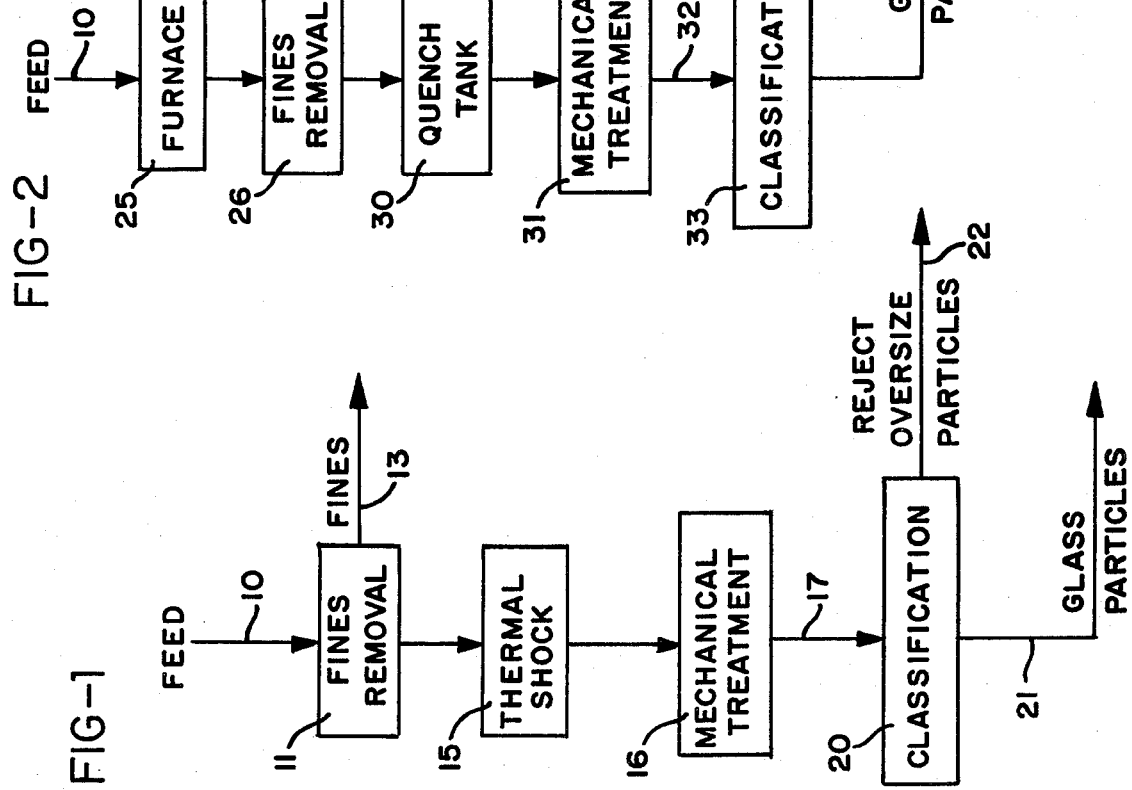

METHOD FOR SEPARATING GLASS FROM HEAT RESISTANT MATERIALS

BACKGROUND OF THE INVENTION

This invention relates broadly to the recovery of reusable materials from refuse, and particularly to the recovery of broken glass from particles of metal, ceramic and other heat resistant materials.

Much attention has been directed lately to the recovery of various materials from municipal refuse so that they may be recycled and reused. Glass is one such material, since glass cullet, i.e., broken glass, is an important ingredient in glass manufacture. Cullet, added to the basic ingredients of glass (sand and soda ash), physically aids in the reaction by conducting heat and thus reducing overall energy used in the melting process by up to 20%, and if there is not sufficient cullet available from in-house rejects, glass manufactures often recycle part of their production. Thus glass recovered from refuse has a ready use as cullet, provided it is free of contaminant metal, ceramic, stones and the like.

In order to use glass recovered from refuse as cullet, it should be free of unmeltable material and metals. Contaminants produce flaws in glassware and plug the spinnerettes used in glass fiber manufacture. The major contaminants in glass recovered from refuse are aluminum, iron, high melting point stones, and refractories, such as brick, porcelain and chinaware. The procelain insulators on spark plugs can be a particularly troublesome contaminant. Generally three methods have been considered for mechanically separating contaminants from the glass recovered from refuse, namely optical sorting, froth flotation, and dense media flotation.

Optical sorting normally involves reducing the particle size of the mixture containing the glass to less than one inch, screening to remove fines, separating out the organic materials, removing any metal, and finally using optical sorters to remove opaque ceramic materials and sort the glass by color. An example of such a process is set forth in U.S. Pat. No. 3,802,558 to H. S. Rhys. Such a process can produce flint, green and amber colored cullet, but it has a practical disadvantage in that it can best handle particles of a limited size range, generally one-quarter to three-quarter inch in diameter, because of the fact that the particles must be passed individually and serially past the optical sensors, thereby limiting productive capacity.

In the froth flotation method, the refuse is dry shredded; the organics are floated off using a dense media or rising current method; the metals are removed; the glass, stones and ceramics mixture is ground to $-20$ mesh; and finally the glass is froth floated off using chemical surfactants while the nonglass sinks. The froth flotation method suffers from a number of disadvantages including the fact that the $-20$ mesh material tends to blanket and insulate the melt in the glass furnace and to blow away causing air pollution. Further, grease and other chemical contaminants interfere with the effectiveness of the flotation process.

In the dense media method, the refuse is reduced to a mixture of only glass, stones and ceramics, and a dense media is then used to float the glass, while the contaminants sink. The dense media method suffers from the disadvantage that the specific gravity of glass is close to that of the contaminants, resulting in poor separation and reduced glass yield.

A need therefore exists for an improved method for separating glass from heat resistant contaminants which is simple, efficient and inexpensive.

SUMMARY OF THE INVENTION

The invention is broadly directed to an improved method of recovering glass from mixtures of broken glass with metal and high melting point stones and refractories, such as brick, porcelain, spark plugs, chinaware, and the like. Municipal refuse is a principal source of broken glass which can be recovered by means of the invention, and since the glass therein is generally container glass, the description herein will deal chiefly with the recovery of cullet for reuse in containers, but the invention can be applied to any mixture of glass and thermal shock resistant materials.

While the detailed description hereinafter includes several forms of the method of the invention, they are all characterized by including two basic steps:

A. Thermally shocking a mixture of glass, metals, stones and ceramics by subjecting it to a rapid increase or decrease in temperature, which induces cracking and shattering of the glass due to its relatively high coefficient of expansion and amorphous nature, while the contaminant materials resist cracking.

B. Classifying the thermally shocked particles using a screen of a size which the broken glass particles will pass through because they have been reduced in size, while the stone, ceramic and other contaminant particles are retained on the screen because they have not been reduced in size, and so may be discarded or subjected to further processing.

It is also essential at some stage of the method to eliminate all fine particles, because a substantial portion of the fines will be contaminant materials. This can be done by an initial classifying step in which the mixture of glass and contaminant particles is screened through openings of predetermined small size, e.g., one-eighth inch, capable of passing correspondingly small sized particles and fines of all types. The fraction retained by the screen openings is then subjected to the main process steps outlined above, and the classifying step is performed with the aid of the same sized or slightly smaller screen openings, which will pass the shattered glass particles but retain the ceramic and other contaminant particles, thereby effectively separating the glass from its contaminants.

A further modification which will frequently be found to be desirable is to include a plural stage initial classifying step wherein the mixture of glass and contaminant particles is screened through plural stages of progressively smaller openings which thereby separate the mixture into plural fractions of respectively large, intermediate and small particle size ranges. In a two-stage method, the larger screen openings should be selected to retain particles of sufficient size for particle sorting by optical means or the like, e.g., ¼ inch openings. In this case, the small size openings should be of the order of one-eighth inch in diameter, so that the only particles passing therethrough will be of sufficiently small size to be without reclaimable value.

The intermediate size fraction obtained by this two-stage screening step may then be subjected to the main process steps outlined above, which will result in reducing the size of the glass particles sufficiently to enable them to pass through the small size screening openings, while the ceramic and other contaminant particles will be retained by those screen openings and can be discarded or otherwise handled. If more than two stages are used, the particles retained at each stage may be separately subjected to the other steps, in order to produce multiple glass fractions of progressively finer particle sizes, and the fraction retained on the larger mesh screen can be treated by the method of the invention or by optical or other sorting methods.

The thermal shock treatment can be carried out in a variety of ways and with varying severity. For example, the mixture may be heated gradually to an elevated temperature which should preferably be below the point at which the glass becomes tacky, followed by a sudden reduction in temperature as by quenching in liquid at ambient temperature or less. Alternatively, the mixture may be heated rapidly to a high temperature from ambient temperature or less. Thus the term "thermal shock" is intended to include rapid increases or decreases from ambient temperatures, singly or in rapid alternating succession, as well as gradual heating or cooling followed by rapid cooling or heating, regardless of whether the latter rapid step is done immediately after the gradual step or after some further intermediate step.

The extent of the temperature range employed in the thermal shock treatment is not critical, but for preferred results, it should be substantial, e.g., 1,000°F or more. If the treatment involves heating from ambient temperature followed by quenching to ambient temperature or less, a maximum heat in the range of 1,000° to 1,400°F will give optimum results, and it is desirable that the mixture not be heated to the temperature at which the glass begins to become tacky. An important advantage of thermal shock treatment by heating and quenching in a temperature range of this order is that if there are any organic contaminant materials in the mixture, as is particularly likely if the mixture is recovered from municipal waste, they will be eliminated by incineration.

In most cases, it will be found that thermal shock treatment is not itself adequate to shatter the glass for the purpose of the invention, particularly if it is not accompanied by some degree of agitation. In other cases, it may be found that the thermal shock treatment induces multiple cracks in the glass particles without causing all of them to shatter. In such cases, the thermal shock treatment can advantageously be followed by a mechanical treatment of sufficient controlled severity to cause the cracked glass particles to shatter along the cracks therein. Such mechanical treatment may be applied in a variety of ways, as by the use of rubber rolls, a screw conveyor in which the mixture receives sufficient agitation and mechanical interaction of the particles on themselves to complete the shattering of the glass particles, and the like, and in some cases sufficient agitation may occur in the screening operation to effect adequate shattering.

In those cases where the thermal shock induces only cracking of the glass without significant shattering, screening of the mixture for elimination of fines may be accomplished after the thermal shock treatment and before mechanical treatment to complete the shattering. If, however, the thermal treatment comprises heating and quenching, the fines can be screened out between the heating and quenching steps, at which time no significant shattering of the glass will have occured, but whatever organic contaminants were present will have been reduced to ash for removal with the other fines. Otherwise, however, it is generally more practical to screen out the fines before the mixture is heated, since no useful result is accomplished by heating the inorganic fines and their presence may require more heat than would otherwise be needed. Note also that the fines can be readily removed by methods other than screening, e.g., air classification, especially if this is done before the thermal shock treatment.

The sizing or classification of the particles is not critical, although a middle size or intermediate fraction of less than one-quarter inch and greater than one-eighth inch measured at its longest dimension is preferred. Selecting a narrow range of sizes for the middle fraction will provide more control on the initial or final sizes involved, and generally higher glass recoveries. But there is no criticality in the size range for the middle fraction. Further, the upper and lower size limitations will generally depend upon the practicalities of handling the particles involved. Thus when the material is too small, it becomes powdery and is difficult to handle as well as to classify, because of fluid surface tension and like forces. Powdery size particles can be avoided by screening. Also, since the larger particles, i.e., the oversize fraction, can be sorted by other techniques, such as by the optical sorting method, it may be desirable to do so.

As can be seen, the improved method is simple, does not involve a great deal of expensive equipment, and does not require serial handling of the particles. Further, it produces sufficiently varied particles, i.e., size differences, that the glass can be efficiently sorted from the non-glass particles, resulting in relatively high glass recovery.

It is therefore an object of the invention to provide an improved method and apparatus for sorting glass particles heat resistant contaminant materials, e.g., the metal, ceramic and stone particles with which broken glass is mixed in municipal refuse, and which are simple, inexpensive and efficient.

Other objects and advantages of the invention will be apparent from the following description, the accompanying drawings and the appended claims.

BRIEF DESCRIPTION OF THE DRAWINGS

FIG. 1 is a flow diagram of a typical embodiment of the improved glass recovery method of the invention; and FIGS. 2 and 3 are flow diagrams of other embodiments of the method of the invention.

DESCRIPTION OF THE PREFERRED EMBODIMENTS

FIG. 1 illustrates a form of the method of the invention wherein the feed represented by the arrow 10 is assumed to be a mixture of broken glass with pieces of metal and other heat resistant contaminants, such as may be recovered from municipal solid waste, as described in Marsh U.S. Pat. No. 3,720,380, by pulping the frangible portions of the waste to a preselected maximum particle size and centrifugally cleaning the resulting slurry to isolate a mixture of the glass, metal and other inorganic materials. This feed 10 is shown as first subjected to a fines removal operation at the station 11, which represents a screen having perforations of relatively small size, e.g., ⅛ inch in diameter, the fines accepted by this screen being discarded as indicated by the arrow 13.

The mixed particles retained by the screen 11 are then submitted to thermal shock at the station 15, a typical example of suitable means for use at this station being a furnace wherein the mixture can be heated to a desired high temperature, e.g., 1,000°–1,400°F., followed by a quench tank containing liquid maintained at ambient temperature or less. The structure of the furnace used at the station 15 is not critical so long as it will heat the mixture to the desired high temperature range. It may be of any conventional construction, including a moving belt furnace where the mixture is treated with hot gases as it passes therethrough, or a compartmentized furnace comprising multiple heating stages. The quench tank may contain any suitable liquid, ranging from water to liquid nitrogen. Alternatively, the station 15 can comprise a tank of supercooled liquid followed by a tank of liquid such as water at ambient temperature or higher, or a series of alternating hot and cold such treatment stages, including treatment by alternatively hot and cold gas.

The effect of the thermal shock treatment at the station 15 is to cause the glass particles to develop multiple cracks, and preferably to cause some of the particles to shatter along the resulting induced cracks, while the metal, ceramics and other heat resistant materials will remain effectively unchanged. The thermally shocked mixture is accordingly then conducted to a stage 16 where it is subjected to a mechanical treatment which is preferably of sufficient force to cause the glass particles to separate along the induced cracks therein but not sufficiently severe to shatter any of the heat resistant contaminant particle or to reduce the glass particles to excessively fine powder, e.g., less than −100 mesh. As previously noted, this result may be accomplished by agitation developed in the mixture by any of a variety of means such as paddles, fluid jets, or a mechanical conveyor, represented by the arrow 17, which conducts the mixture to the next station 20. Another specific example of suitable means for accomplishing this treatment is a pair of rubber coated rolls spaced sufficiently close together to cause the cracked glass particles to disintegrate but to yield to the harder contaminant particles.

The station 20 to which the mechanically treated mixture is conveyed from the mechanical treatment station 16 will advantageously comprise a screen having screening openings of the same size as the screen openings in the fines removing station 11, or slightly smaller. Such a screen will accept the disintegrated glass particles, represented by the arrow 21, but retain the non-disintegrated metal, ceramic and other heat resistant particles, which constitute the reject represented by the arrow 22. The accepted fraction 21 will be sufficiently pure glass cullet for reuse in glass manufacture, even if it includes a significant amount of fines, since those fines will also be glass. As previously noted, the mechanical treatment station 16 may be combined with the classifying station 20, e.g., in the form of agitating means cooperating with the screen, or as a screw conveyor 17 from the thermal shock station 15 directly to the classifying station 20.

FIG. 2 illustrates one of the modifications of the method of the invention previously described, wherein the feed 10 of mixed glass and heat resistant contaminants is first delivered to a furnace 25 and then to a fines removal station 26 where the fines are rejected as indicated by the arrow 27. The resulting preliminarily classified hot mixture is then delivered to a quench tank 30 and thereafter to a mechanical treatment station 31, conveyor 32 and classifying station 33 which correspond respectively to the stations 16, 17 and 20 in FIG. 1. The accepted glass particles and the reject contaminant particles are represented in FIG. 2 by the arrows 35 and 34 respectively. As previously noted, the positions of the quench tank 30 and fines removal station 26 could be interchanged, but this could result in increasing the amount of glass rejected with the other fines if substantial disintegration of the glass is caused by quenching.

FIG. 3 illustrates the application of the invention to the separation of glass in conjunction with means for optically sorting glass particles of substantial size from contaminant particles. The feed 40 of mixed glass and heat resistant contaminants is subjected first to two classification steps, the station 41 being illustrated as having a screen of relatively large perforations, e.g. ¼ inch, for the removal of oversized particles at 42, followed by a second station 44 having a relatively fine screen, e.g., ⅛ inch perforations, for the removal of fines at 45. The resulting intermediate fraction is then advanced successively through the thermal shock station 50, mechanical treatment station 51, conveyor 52 and classification station 53, where a screen of the same size perforations as at station 44, or slightly smaller, separates the contaminant particles 54 from the glass particles 55.

In the system of FIG. 3, and with perforations of the stated sizes, the oversized particles removed at 42 can be optically sorted, but they could also be passed through a series of stations similar to the stations 50–53 wherein the screen at the final classifying station has perforations of the same size as, or slightly smaller than, those at the station 41, and will therefor accept the shattered glass particles but again reject the contaminant particles. It will also be apparent that the station 41 may represent a series of two or more screen of progressively smaller hole sizes, for the purpose of separating a plurality of fractions for further treatment as described.

While the methods of apparatus herein described constitute preferred embodiments of the invention, it is to be understood that the invention is not limited to these precise methods and that changes may be made therein without departing from the scope of the invention.

What is claimed is:

1. A method of recovering glass from a loose mixture of separate particles of glass and of heat resistant materials including metal, stone and ceramic materials, comprising:
    a. thermally shocking the mixture by rapidly increasing or decreasing its temperature over a sufficiently wide range to shatter the glass,
    b. classifying said thermally shocked mixture to obtain a fine fraction consisting essentially of said shattered glass particles and a coarse fraction consisting of said heat resistant materials, and
    c. said method also including the step of establishing a predetermined particle size range for said mixture prior to said thermal shock step.

2. The method defined in claim 1 comprising the additional step of mechanically treating said thermally shocked mixture prior to said classifying step to effect shattering of the glass along the cracks induced therein by said thermal treatment.

3. The method defined in claim 1 comprising the initial step of screening the mixture through openings of predetermined size into two fractions of different size ranges, and performing said thermal shock treatment on the resulting fraction of the larger size range.

4. The method defined in claim 1 wherein said thermal shocking step comprises gradual heating of said mixture followed by rapid cooling of said heated mixture.

5. The method defined in claim 1 wherein said thermal shocking step comprises rapid heating of said mixture.

6. The method defined in claim 1 wherein said thermal shocking step comprises alternate rapid heating and cooling of said mixture.

7. The method defined in claim 1 wherein said increase or decrease in temperature is at least approximately 1,000°F.

8. The method defined in claim 1 wherein said mixture is heated to a temperature less than the tacky point of the glass particles.

9. The method defined in claim 3 wherein said classifying step comprises screening said thermally shocked fraction through openings of the same said predetermined size.

10. A method as defined in claim 1 comprising the initial step of screening the mixture through openings of predetermined large and small sizes to produce a separate middle size fraction, performing said thermal shocking on said middle size fraction, and performing said classifying step by screening said thermally shocked fraction through openings of said small size.

11. A method as defined in claim 10 comprising the additional step of mechanically treating said thermally shocked fraction prior to said classifying step to effect shattering of the glass along the cracks induced therein by said thermal treatment.

12. A method as defined in claim 11 wherein said thermal shock step comprises gradual heating of said fraction followed by rapid cooling thereof.

13. A method as defined in claim 11 wherein said thermal shock step comprises rapid heating of said fraction.

* * * * *